June 14, 1927.
W. L. FAIRCHILD
1,632,394
APPARATUS FOR PRODUCING PNEUMATIC TUBES
Filed Oct. 19, 1925   3 Sheets-Sheet 1
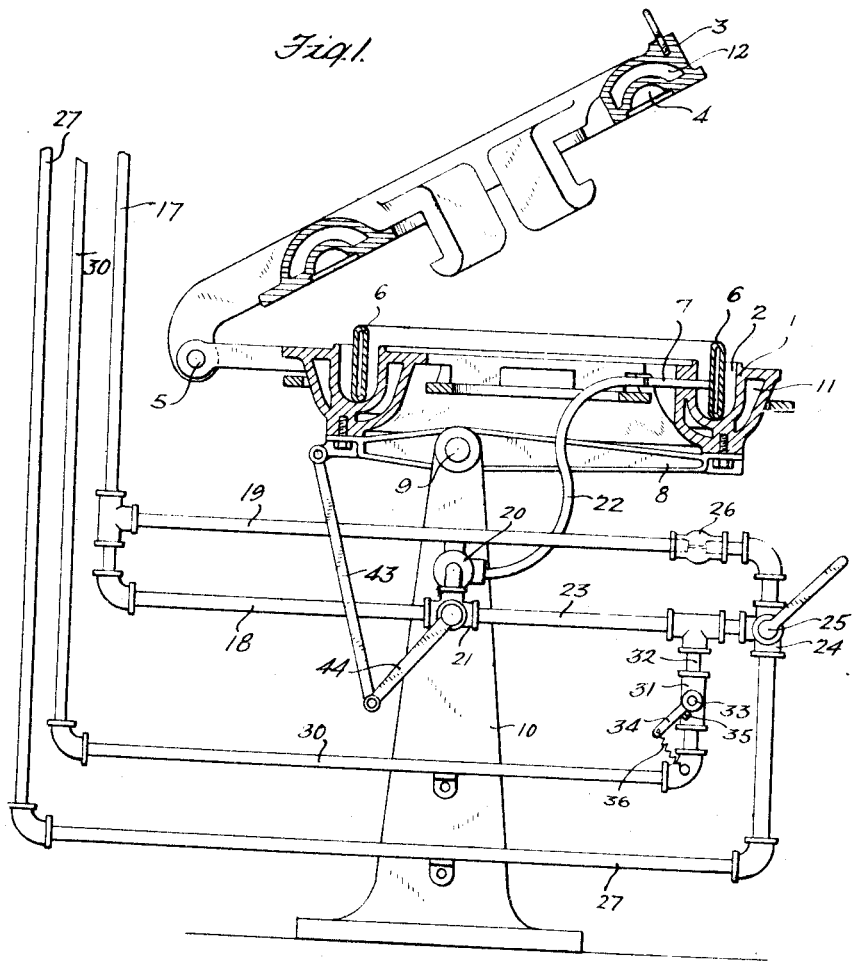
INVENTOR
WALTER L. FAIRCHILD
BY
ATTORNEY June 14, 1927.
W. L. FAIRCHILD
1,632,394
APPARATUS FOR PRODUCING PNEUMATIC TUBES
Filed Oct. 19, 1925
3 Sheets-Sheet 2
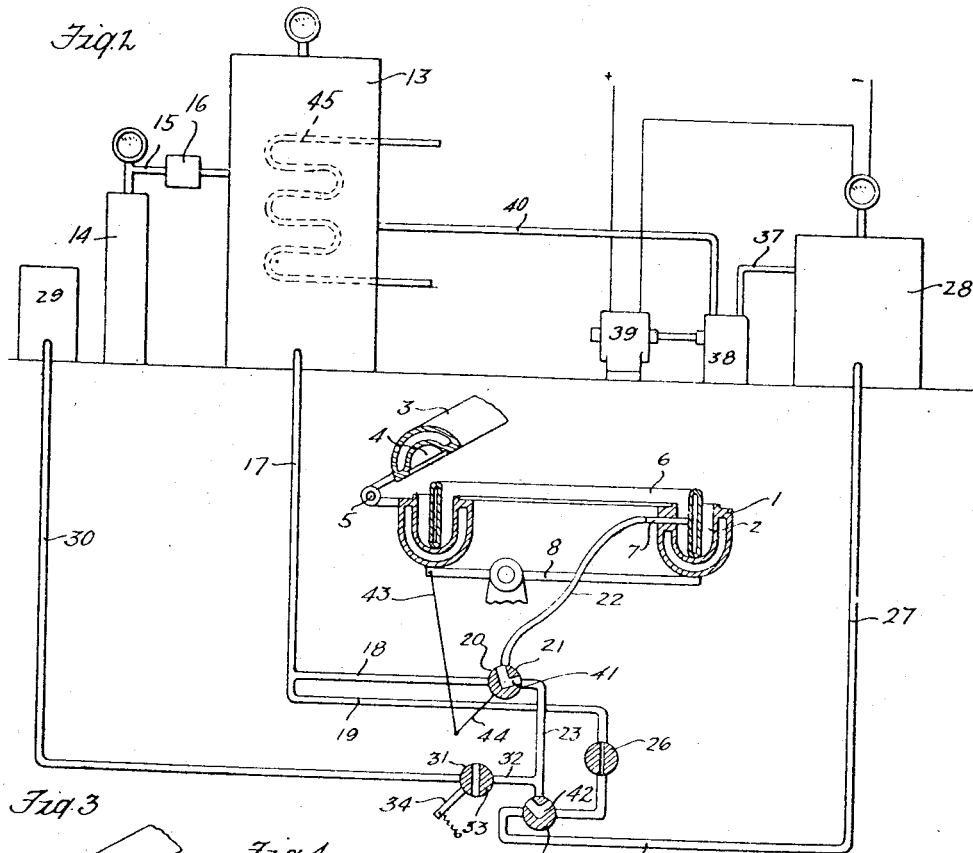
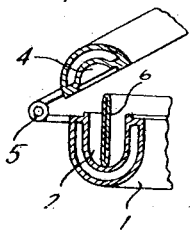
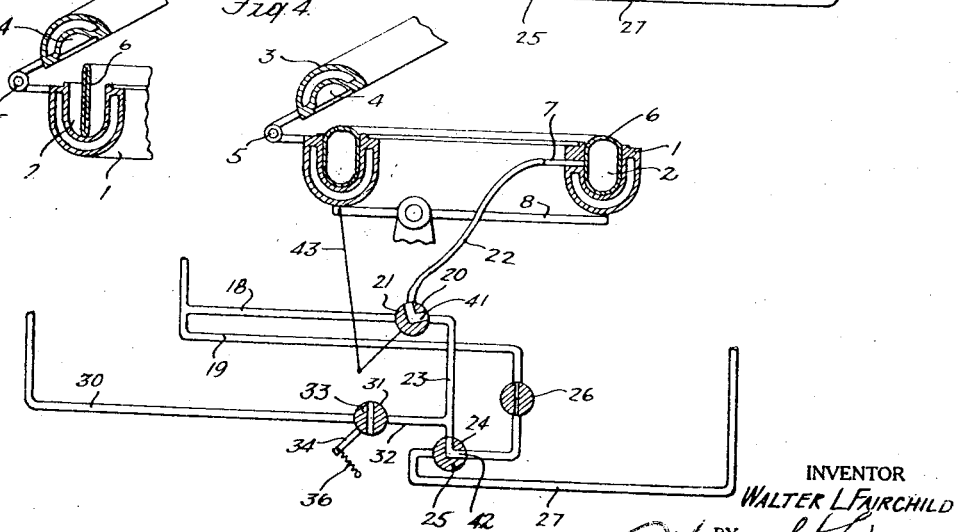
INVENTOR
WALTER L FAIRCHILD
BY
ATTORNEY June 14, 1927.  W. L. FAIRCHILD  1,632,394
APPARATUS FOR PRODUCING PNEUMATIC TUBES
Filed Oct. 19, 1925  3 Sheets-Sheet 3
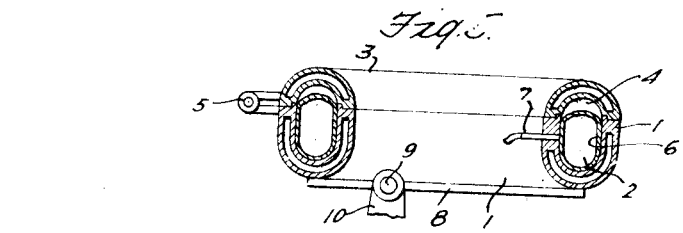
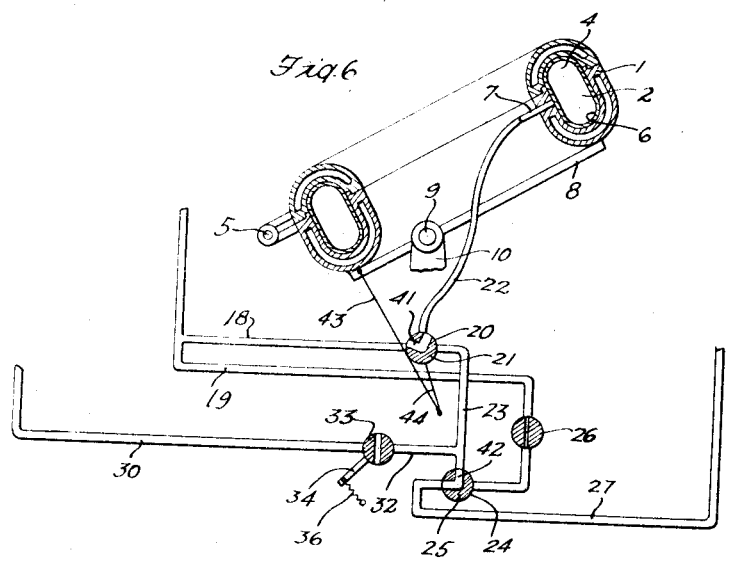
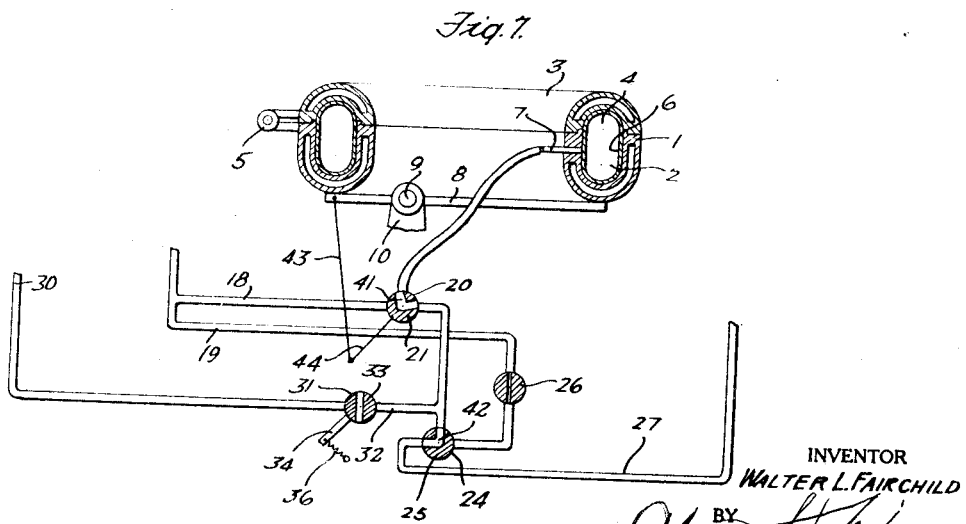
INVENTOR
WALTER L. FAIRCHILD
BY
ATTORNEY Patented June 14, 1927.

1,632,394

UNITED STATES PATENT OFFICE.

WALTER L. FAIRCHILD, OF NEW YORK. N. Y.

APPARATUS FOR PRODUCING PNEUMATIC TUBES.

Application filed October 19, 1925. Serial No. 63,368.

This invention relates to a new and improved apparatus for producing hollow articles out of raw rubber compound. more particularly to new and improved apparatus for vulcanizing tubes formed of raw rubber compound to produce pneumatic tubes and the like.

One of the objects of the invention is to provide an apparatus for producing seamless pneumatic tubes from spliced tubes formed of raw rubber compound, wherein all the material composing the tube is thoroughly and uniformly vulcanized.

Another object of the invention is to provide new and improved apparatus of the above character, which may be operated more expeditiously than has been possible to operate inner tube vulcanizing apparatus as hitherto constructed.

A further object of the invention is to provide inner tube vulcanizing apparatus wherein individually heated molds are employed, into which the tubes are positioned before vulcanization and wherein an inert gas, such for instance as carbon dioxide, is maintained under pressure and predetermined temperature within the tube during the vulcanizing operation.

Other objects and aims of the invention, more or less specific than those referred to above. will be in part obvious and in part pointed out in the course of the following description of the elements, combinations, arrangements of parts and applications of principles, constituting the invention; and the scope of protection contemplated will be indicated in the appended claims.

In the accompanying drawings wherein I have illustrated a preferred form of embodiment of my improved apparatus.

Figure 1 is a view in side elevation. partly in section of a portion of my improved apparatus.

Figure 2 is a view showing a portion of the mold in vertical section and other portions of the apparatus more or less diagrammatically.

Figure 3 is a view of a portion of the apparatus, showing the unvulcanized tube resting in the mold after having had one of the operations of the machine performed thereon.

Figure 4 is a view of a portion of the apparatus. showing the tube resting in the mold after having been subjected to another or further operation of the machine.

Figure 5 is a vertical sectional view of the mold, showing the tube enclosed within the sections of the mold ready to be subjected to the vulcanizing operation.

Figure 6 is a view similar to Figure 4, showing the mold in a different position, and Figure 7 is a similar view, showing the parts in the position they occupy immediately subsequent to vulcanization.

Similar reference characters refer to similar parts throughout the several view of the drawings.

Referring now to the drawings, the reference numeral 1 denotes one section of a circular mold, having an ecliptically formed channel 2, constituting one part of the molding or vulcanizing chamber. The reference numeral 3 illustrates the second section of the mold, which is provided with a complementary molding or vulcanizing recess 4, said mold sections being hingedly connected at 5, so that when the section 3 overlies the section 1 as indicated in Figure 6 of the drawings, a closed chamber ecliptically formed in cross section will be provided between the mold sections, adapted to receive a tube of raw rubber compound, indicated at 6, upon which the vulcanizing operation is to be performed.

This tube, which as above stated, is composed of raw rubber compound, has been previously produced, as by means of a tubing machine, has had its ends brought together in overlapping or abutting relation, and has had a valve stem 7 inserted therein. The tube thus formed is inserted in the channel 2 of the lower mold section 1, which has been previously disposed in a horizontal position, the position of the tube within said mold section being illustrated in Figure 1.

The lower mold section 1, which supports the upper mold section, is mounted upon an arm or support 8. said support being in turn journaled at 9 to an upright standard 10, the construction being such that the mold as a unit may be swung from its normal horizontal position shown in Figure 1, to the tilted position shown in Figure 6.

The mold sections 1 and 3 are each steam-jacketed, the steam chambers of the mold of said sections being respectively indicated at 11 and 12. While in the present instance the means for supplying the heating medium to the mold sections are not shown, it will be understood that both of said sections are intended to be always maintained at the vulcanizing temperature required for the particular compound of raw rubber being subjected to the vulcanizing operation.

It will be further understood, of course, that the edges of the mold sections are very nicely machined, so that their meeting edges fit closely together, means being provided to lock the mold sections in their closed position against the gaseous pressure confined in the tube within the mold being subjected to the vulcanizing operation.

Referring now to the apparatus employed for inserting and withdrawing the gases utilized within the tube prior and subsequent to the carrying out of the vulcanizing apparatus, the reference numeral 13 indicates a tank adapted to contain under pressure the fluid vulcanizing medium to be employed within the tube. While various inert gases may be employed in this operation, I prefer to employ carbon dioxide gas, which I have found to be an excellent vulcanizing medium. The supply of gas to the tank 13 may be replenished as required from a high pressure tank 14 through the conduit 15, which may, if desired, be provided with an automatically operating control valve shown diagrammatically at 16. Leading from the tank 13 is a conduit 17, and leading from the conduit 17 are the branches 18 and 19, the former leading to the casing 20 of a two-way valve 21. The casing 20 of the valve 21 is connected with the valve stem 7 of the tube to be vulcanized, as by means of a flexible tube 22.

Leading from the valve casing 20 is a conduit 23 which connects with a valve casing 24 of a two-way valve 25, the branch conduit 19 of the conduit 17 being also connected to said valve casing 24, which branch conduit 19 is preferably provided with a pressure reducing valve 26. Leading from the valve casing 24, is a conduit 27, the other end of which leads into the vacuum tank 28. The reference numeral 29 denotes a vacuum tank from which leads a conduit 30 which is connected with a valve casing 31 and leading from the valve casing 31 is a conduit 32 which connects with the casing 23. The valve conduit 31 is provided with a valve 33, operated by means of a handle 34, which handle is normally urged into engagement with a stop 35 by means of the retractile spring 36, the valve 33 being normally held thereby in a closed position, as clearly indicated in the drawings.

Leading from the vacuum tank 28 is a conduit 37 which is connected with the pump 38 driven by means of a motor 39, and leading from the pump 38 to the tank 13 is a conduit 40. The valve member 21 is provided with a substantially L-shaped passageway 41, said valve member being adapted to be rotated to such position that communication will be established between the branch conduit 18 and the flexible tube 22, or between the latter and the conduit 23, or to be moved into such position as will shut off all intercommunication between said conduits.

The valve member 25 is provided with an L-shaped passageway 42, said valve member being adapted to be rotated to such positions as will establish communication between the conduits 23 and 27, or the conduit 23 and between branch conduit 19, or it may be rotated to a neutral position whereby communication between all of said conduits may be shut off. The platform or support 8 is provided with a link 43 which is connected to the end of the arm 44 extending from the valve 21, so that when the mold is swung upon its pivotal axis to the position indicated in Figure 6, said valve member 21 will be rotated so that communication will be shut off between the conduit 23 and the flexible tube 22, and communication established between the branch conduit 18 and the flexible tube 22 for a purpose which will be hereinafter described.

Referring now to Figure 2 of the drawings, I have provided means whereby, if desired, the carbon dioxide gas may be discharged into the tube to be vulcanized at any desired temperature and pressure. This means consists of a steam coil 45 located in the tank 13 which may receive its supply of steam from any desired source.

I have found that in some instances it is desirable to discharge the vulcanizing gas into the tube to be vulcanized in a relatively cool condition, so as to slightly retard the heating of the unvulcanized rubber compound due to its contact with a heated surface of the lower section of the mold, thereby to prevent such softening of the rubber compound as might permit the tube to lop or fall over the edge of the mold, whereby when the upper section is positioned thereon the tube might be pinched between the meeting edges of the mold sections. It is, of course, desirable that the vulcanizing gas be discharged into the tube to be vulcanized at a temperature as close to the vulcanizing temperature of the mold as it is possible, to do without softening the raw rubber compound before the mold sections are closed about the tube and the latter expanded within the mold immediately prior to the starting of the vulcanization operation. The reason for this is that it is desirable to bring the temperature within the tube to the temperature exteriorly thereof as quickly as possible so that a uniform vulcanization of the tube wall may be accomplished, and it is also desirable in order that time be not consumed in heating the gas within the tube by the application of the exterior heat of the mold. By the provision, therefore, of means whereby the temperature of the vulcanizing gas may be regulated to a nicety, I obtain the aforementioned desideratum and am able to heat the carbon dioxide to the safety limit, which limit of course depends upon the size of the tube and the composition being treated.

Having thus described the construction of this embodiment of my invention, the operation thereof may now be understood.

Assuming the parts to be in the positions shown in Figure 1, with the tube 6 partly collapsed and inserted in the lower section of the mold in the position shown in said figure and assuming a vacuum to have been established in the tank 29, the tank 13 to contain carbon dioxide gas under suitable pressure and temperature, a vacuum to have been established in the tank 28, and the valve stem 7 connected with the flexible tube 22: in the first operation, the operator swings the valve lever 34 to open for an instant the valve 33, whereby any air present in the partially collapsed tube will be sucked therefrom through the conduit 30 by the vacuum tank 29, so that the tube will take on the appearance of Figure 3, that is to say, the tube will be entirely collapsed within the mold section 1. The valve 25 is then revolved to establish communication between the conduit 23 and the branch conduit 19, whereupon the carbon dioxide gas will flow from the tank 13 through the conduit 17, the branch conduit 19, the reducing valve 26, the passageway 42 of the valve 25, the conduit 23, through the passageway 41 of the valve 21, the flexible tube 22, through the valve stem 7 to the collapsed tube about to be vulcanized.

It is intended in this operation to project just a sufficient amount of carbon dioxide gas into the tube to expand it, so that it will take on the form substantially shown in Figure 4 of the drawing, that is to say, the tube will be caused to engage with the wall of the vulcanizing channel of the lower section 1 of the mold, the upper end of the tube projecting slightly above the edges of the channel 2 of said lower section. The reducing valve 26 is intended to so cut down the pressure of gas that there will be little danger of bursting or injuring the tube through this operation.

When this operation has been accomplished, the valve 25 is closed. The upper section 3 of the mold is then swung downwardly upon the lower section, and the sections tightly locked together. (Fig. 5) whereby the partly expanded tube lies within the circular vulcanizing channel of the mold, ready for the vulcanizing operation. It will be understood that all of these operations are performed very expeditiously, because of the fact that the mold sections 1 and 3 have been previously heated to the vulcanizing temperature, and are at all times maintained at such temperature, it being essential to keep the unvulcanized rubber tube from wilting within the mold due to its contact with the heated section 1. The projection of the cold carbon dioxide or like gas into the tube also assists in maintaining the tube from injury until the upper section has been closed down upon the lower section to enclose the tube prior to the vulcanizing operation, which is now ready to be carried on.

When the upper section has been closed down upon the lower section, as above described, the operator then quickly tilts the mold as a unit to the position shown in Figure 6 whereby the valve 21 will be moved to establish communication between the interior of the tube to be vulcanized and the source of carbon dioxide supply in the tank 13, through the valve stem 7, the flexible tube 22, the valve passageway 41, branch conduit 18, and the conduit 17. The inner tube 6 will thereupon be further expanded by the heated carbon dioxide gas, so that it will lie in close contact with the wall of the vulcanizing chamber, such pressure being held within the inner tube as will maintain its close engagement with the wall of said vulcanizing chamber during the vulcanizing operation.

The mold is permitted to remain in the position shown in Figure 6 of the drawing during the entire vulcanization operation, the time of which will, of course, be determined by the relative heat of the mold, and the particular compound of which the tube is composed. The holding of the mold in the inclined position during the vulcanizing operation, I regard as most important, because when the mold is in that position it is possible to drain the upper section thereof of its condensation, which draining is easily accomplished with the lower section whatever its position. I am thereby able to maintain both sections of the mold in an equally heated condition during the vulcanization.

When the vulcanizing operation has been completed, the mold will be swung to its horizontal position, whereby communication will again be established between the interior of the vulcanized tube through the valve stem 7, flexible tube 22, valve passageway 41, and the conduit 23. The valve 25 then is swung to the position shown in Figure 7, thereby connecting the conduit 23 through said valve passageway 42 and conduit 27 with the vacuum tank 28, whereby the source of suction will quickly remove all of the carbon dioxide gas in the vulcanized tube, causing it to collapse within the mold, thereby disengaging itself from the wall of the vulcanizing chamber. The mold is then opened, and the vulcanized tube removed, whereupon the apparatus is in position to perform another vulcanizing operation similar to that just described.

The pump 38 serves to maintain a vacuum within the tank 28, pumping the carbon dioxide gas back into the supply tank 13, it being understood that, in practice, automatically operating devices will be employed to start and stop the pump 38, the reducing valve 15 operating automatically to maintain a constant predetermined pressure within the tank 13, when the supply of carbon dioxide gas in the tank 13 is required to be replenished from the main carbon dioxide supply tank 14.

It will accordingly be seen that I have provided apparatus well adapted, among others, to attain all the ends and objects above pointed out, in a very simple manner. By means of my improved apparatus, seamless inner tubes may be produced in such a way that there is no unequal stretching of the unvulcanized rubber from which the vulcanized tube is formed, the wall of the tube thus formed being of uniform thickness and evenly vulcanized throughout. Moreover, the presence of the carbon dioxide gas in the tube prior to the starting of the vulcanizing operation insures against injury of the tube while the latter is being enclosed within the sections of the mold. Inasmuch as carbon dioxide or like uncondensible gas within the safe temperature which may be used in rubber vulcanization is employed within the inner tube during the vulcanizing operation, the inner wall of the tube is in a dry condition during and after vulcanization.

The initial sucking out of the air in the unvulcanized tube before carbon dioxide gas is projected therein insures against mixing air with the carbon dioxide gas, whereby the latter will not be diluted, so that it may be used repeatedly in carrying out the aforementioned operation.

It will be understood that various changes may be resorted to in the form, construction and arrangement of the several parts without departing from the spirit and scope of my invention; and hence, I do not intend to be limited to the details herein shown and described except as they may be included in the claims.

Having thus described my invention, what I claim as new and desire to secure by Letters Patent, is:—

1. In an apparatus of the class described, in combination, a mold comprising a pair of mating sections having complementary vulcanizing channels, said mold sections when positioned in mating relation forming a continuous circular vulcanizing chamber adapted to receive a tube to be vulcanized, means for withdrawing air from said tube, means for introducing an inert gas into said tube partially to expand it within the lower section of the mold, said upper section being adapted to be closed upon said lower section to enclose said partially expanded tube, automatically controlled means for thereafter introducing a further quantity of said inert vulcanizing gas into said tube for expanding it within said mold, and means for withdrawing said vulcanizing gas from said tube when the vulcanizing operation thereon has been completed.

2. In an apparatus of the class described, in combination, a mold comprising a pair of mating sections having complementary vulcanizing channels, said mold sections when positioned in mating relation forming a continuous circular vulcanizing chamber adapted to receive a tube to be vulcanized, means for withdrawing air from said tube, means for introducing an inert gas into said tube partially to expand it within the lower section of the mold, said upper section being adapted to be closed upon said lower section to enclose said partially expanded tube, automatically controlled means for thereafter introducing a further quantity of said inert vulcanizing gas into said tube for expanding it within said mold, means for preheating said inert vulcanizing gas and means for withdrawing said vulcanizing gas from said tube when the vulcanizing operation thereon has been completed.

3. In an apparatus of the class described, in combination, a mold comprising a pair of mating sections having complementary vulcanizing channels, said mold sections when positioned in mating relation forming a continuous circular vulcanizing chamber adapted to receive a tube to be vulcanized, means for withdrawing air from said tube, means for introducing an inert gas into said tube partially to expand it within the lower section of the mold, said upper section being adapted to be closed upon said lower section to enclose said partially expanded tube, automatically controlled means for thereafter introducing a further quantity of said inert vulcanizing gas into said tube for expanding it within said mold, means for controlling the temperature of said inert vulcanizing gas prior to its introduction to said tube and means for withdrawing said vulcanizing gas from said tube when the vulcanizing operation thereon has been completed.

4. In an apparatus of the class described, in combination, a movable mold comprising a pair of mating sections having complementary vulcanizing channels, said mold sections when positioned in mating relation forming a continuous circular vulcanizing chamber adapted to receive a tube to be vulcanized, suction means, means for supplying a gas, a valve, means for connecting said valve with a tube within the mold, and mechanism connecting the mold with the valve whereby movement of the mold to one position will open communication between the tube in the mold and the suction means and movement of the mold to another position will shut off communication between the tube and the suction means and open communication between the tube and the means for supplying a gas.

5. In an apparatus of the class described, in combination, a pivotally mounted mold comprising a pair of mating sections having complementary vulcanizing channels, said mold sections when positioned in mating relation forming a continuous circular vulcanizing chamber adapted to receive a tube to be vulcanized, suction means, means for supplying a gas, a valve, means for connecting said valve with a tube within the mold, and mechanism connecting the mold with the valve whereby movement of the mold about its pivot in one direction will open communication between the tube in the mold and the suction means and movement of the mold about its pivot in the opposite direction will shut off communication between the tube and the suction means and open communication between the tube and the means for supplying a gas.

In testimony whereof, I affix my signature.

WALTER L. FAIRCHILD.